United States Patent [19]

Bernhardt

[11] Patent Number: 4,980,624

[45] Date of Patent: Dec. 25, 1990

[54] ADAPTIVE OVERLOAD PROTECTION OF ELECTRIC MOTORS AND STATIC SWITCHING DRIVES

[75] Inventor: Thomas J. Bernhardt, Racine, Wis.

[73] Assignee: Eaton Corporation, Cleveland, Ohio

[21] Appl. No.: 455,049

[22] Filed: Dec. 22, 1989

[51] Int. Cl.$^5$ ............................................. H02P 7/38
[52] U.S. Cl. ....................................... 318/434; 361/31
[58] Field of Search ...................... 318/434, 503, 504; 322/811, 814, 909, 934; 361/23, 24, 25, 31

[56] References Cited

U.S. PATENT DOCUMENTS

| | | | |
|---|---|---|---|
| 4,156,162 | 5/1979 | Warfield et al. | 318/434 |
| 4,445,075 | 4/1984 | Fry | 318/434 |
| 4,491,775 | 1/1985 | Harvey et al. | 318/434 |
| 4,574,226 | 3/1986 | Binder | 318/434 X |
| 4,599,548 | 7/1986 | Schultz | 318/434 X |
| 4,810,943 | 3/1989 | Kawaguchi et al. | 318/434 |
| 4,829,218 | 5/1989 | Bauer | 388/934 X |
| 4,831,313 | 5/1989 | Beilfuss | 361/24 X |

FOREIGN PATENT DOCUMENTS

1275631 12/1986 U.S.S.R. .............................. 361/24

Primary Examiner—William M. Shoop, Jr.
Assistant Examiner—A. Jonathan Wysocki
Attorney, Agent, or Firm—C. H. Grace

[57] ABSTRACT

Protection apparatus for an AC or DC motor (4) and a static drive (8), including a static inverter or a static drive (8). An I$^2$T signal is modified to take account of the frequency with which the switching elements of the drive (8) are switching their load current (at 42) and other factors. The modified I$^2$T signal is lowpass filtered in a filter whose cutoff frequency is also a function of the drive's switching frequency. The resulting drive protection signal is compared with a predetermined threshold. An I$^2$T signal is also modified to take account of the speed of the motor and other factors, then filtered, to provide a motor-related signal (at 90). Upon occurrence of an overload both the drive-related signal and the motor-related signal are indpendently capable of turning off the system by tripping a line contactor (6).

8 Claims, 4 Drawing Sheets

_Fig. 3_

_Fig. 4_

ADAPTIVE OVERLOAD PROTECTION OF ELECTRIC MOTORS AND STATIC SWITCHING DRIVES

FIELD

The invention relates to electric motors that are driven by static inverter drives, and to overload protection of the motors and the drives. In particular, the invention provides coordinated overload protection for an AC or DC electric motor and/or a speed-control drive for that motor.

BACKGROUND

The purpose of overload protection is to prevent the temperature of the motor and/or the drive from exceeding levels that would cause damage. Overload protection trips the drive or relieves the load or alarms the operator or takes other appropriate action when those critical temperatures are approached.

In the prior art such protection is provided by various methods, including the following:

1. An overtemperature switch is mounted in the motor or on the drive at a point where the critical temperature would occur, and is set to actuate when the critical temperature is approached; actuation initiates appropriate protective action.

2. A thermal overload relay is actuated by thermal elements that are conducting motor current or drive load current. The elements heat in proportion to the square of the load current, and melt (after some time delay upon occurrence of an overload), tripping the relay. This is referred to as an $I^2T$ relay because the temperature of the protected device is simulated by the $I^2T$ heating of the thermal elements. $I^2T$ is a quantity related to the heat power dissipation of the motor or inverter, in which I represents load current and T represents time.

3. An electronic overload sensor is provided comprising a multiplier for squaring the current, an integrating filter for delay, and a comparator for comparing the resulting indication of $I^2T$ level with a predetermined threshold and activating the protection when the threshold is reached.

4. A microprocessor having an $I^2T$ algorithm computes the $I^2T$ of the protected device based on sensed load current, compares it with a predetermined threshold value and initiates protective action when the predetermined value is reached.

Generally speaking, the first two approaches increase the manufacturing cost of a variable speed drive system because they necessitate additional equipment; the third and fourth do not. The protection provided by many such prior art systems is not very precise because they rely only upon $I^2T$ simulation, which alone does not give a true representation of temperature.

SUMMARY OF THE INVENTION

It is desirable to ascertain the temperature at a critical location without providing additional sensors, and using only information that is already available at the drive regulator. Generally this information includes indications of motor speed or speed reference, load current, the drive's switching frequency, and certain parameter constants of the system. Some factors involved in such systems which prevent estimates of $I^2T$ alone from properly simulating critical temperature rise are:

1. The motor's cooling capability varies with motor speed if the cooling fan for the motor is driven by the (variable speed) output shaft of the motor.

2. The heating losses in the drive are affected by factors not directly related solely to output load current, including its switching frequency.

The present invention provides protection for a motor and/or a drive which takes into account more of the factors that affect temperature rise than are taken into account in the prior art. This is accomplished without direct sensing of the temperature or of additional other parameters, but by simulating temperature rise using only information that is ordinarily already available to the drive regulator. For example, in the present invention overload protection is based in part on the switching frequency of the inverter as well as on estimates of $I^2T$.

Using this available information, temperature rise above ambient is determined, using intermediate computations involving such quantities as the power dissipation, the thermal resistance, thermal time constant, transient thermal impedance, and lowpass filter constant (i.e., the data-sampling-time interval divided by thermal time constant).

One object of the invention is to provide protection apparatus for an AC or DC motor and drive that turns off the equipment in response to an overload signal, wherein the time delay before turnoff is influenced by the frequency of switching of the drive.

Another object of the invention is to provide protection apparatus for an AC or DC motor and drive, in which an overload signal is provided that is a combination of the square of a load current and a switching frequency factor, filtered to take account of how long the overload continues. Disconnection occurs when the overload signal exceeds a predetermined trip threshold.

Another object of the invention is to provide protection apparatus for an AC or DC motor and drive, in which an overload signal is provided that is a combination of the square of a load current and a motor speed factor that takes account of variable cooling, and which is filtered to take account also of duration of the overload.

Another object is to provide motor and drive protection apparatus that turns off the equipment in response to either (a) a first overload signal based in part upon the frequency of switching of the inverter or (b) a second overload signal that depends in part upon the speed of the motor. The permissible overload time before tripping for an inverter (i.e., drive) overload is different from the permissible overload time for a motor overload. (A motor's thermal time constant might be about 90 minutes, and the thermal time constant of a drive for that motor might be about 7 minutes.)

DESCRIPTION OF A PREFERRED EMBODIMENT

Figure 1:
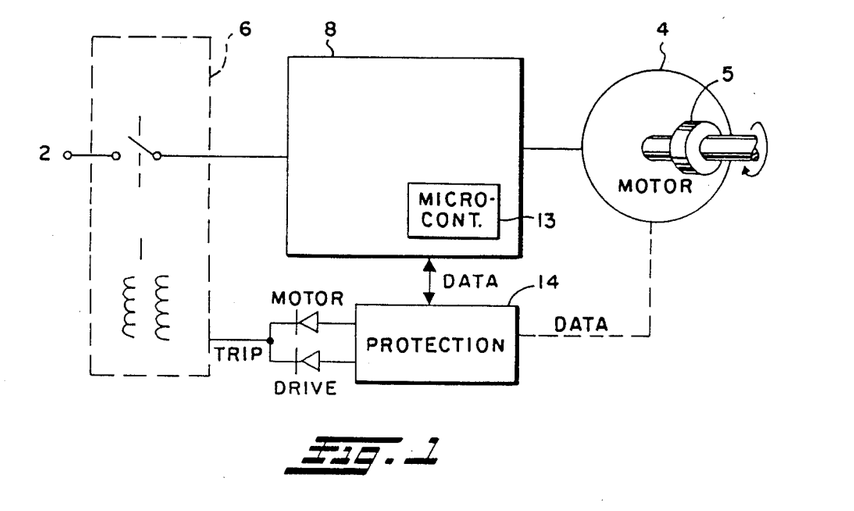
FIG. 1 is an overview block diagram of a motor and a drive for it, utilizing a preferred embodiment of the present invention.

Overview of System, FIG. 1

In FIG. 1 a power line 2 supplies power to a motor 4 through a contactor 6 and a drive 8. A cooling fan 5 is driven by the motor 4 for cooling of the motor. The drive 8, which controls the power to the motor 4, includes a rectifier, a static power circuit, and other equipment.

Protection apparatus 14, which is the main component of the present invention, receives data signals from the motor 4 and the drive 8, and ascertains whether an overload has occurred in either the motor or the inverter. In this particular embodiment, when an overload does occur, the protection apparatus 14 trips off the contactor 6 to protect the motor and drive system by disconnecting it from the power line 2.

To protect the motor 4 and drive 8 from an overload, account is taken of the switching frequency of the drive and the speed of the motor 4, in addition to the square of the electric load current and the duration of the overload. Two independent tripping capabilities are provided. They are (a) drive $I^2T$ tripping, modified by frequency information derived from the drive, and (b) motor $I^2T$ tripping, modified by speed information derived from the motor or the drive.

Because the thermal time constant of the motor 4 is longer than that of the drive, an overload that occurs in the motor is permitted to persist for a longer time than is one that occurs in the inverter. Different tripping times are established. Occurrence of either type of overload trips off both the motor and the drive.

The invented apparatus takes account of the fact that an overload can occur in the motor portion of the equipment or in the drive portion of the equipment. The operating circumstances of both the drive and motor portions are variable. Sometimes circumstances are such that the motor is threatened with damage due to an overload but the drive is not; under other circumstances the drive may be threatened with damage due to overload and the motor is not. In the invented equipment account is taken of some of the factors that cause this variability. When the drive is switching very frequently it is likely to overheat before the motor overheats. When the motor is operating at a low speed its cooling fan is not as effective to remove heat energy from the motor and the motor is likely to overheat before the drive overheats. In an induction motor system the switching frequency and the motor speed do not always track each other closely.

In a preferred embodiment one measurement or estimate of the square of the load current ($I^2$) is made, and that estimate is utilized in two different channels for protection. The drive-protection channel modifies the $I^2$ quantity in accordance with the frequency of switching of the drive. In the other channel, which is the motor-protection channel, the $I^2$ value is modified in accordance with the speed of the motor. When the output of the drive-protection channel indicates danger to the drive, the system can be turned off even if the motor is not in danger. When the value of the output of the motor protection channel reaches a value that indicates danger to the motor the system can be shut down even if the drive is not in danger.

The protection block 14 of FIG. 1 has two outputs—one labeled MOTOR and one labeled DRIVE. Those outputs go to diodes of an OR logic circuit. The output of the OR circuit can trip the entire system off the power line, shutting it down. Either having a motor in danger or having a drive in danger can cause a shutdown.

Figure 2:
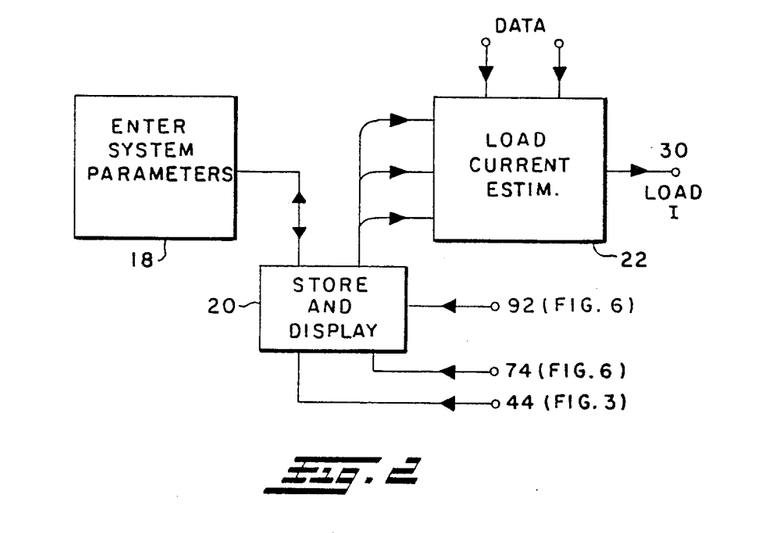
FIG. 2 is a block diagram of a portion of the protection system that relates to load sensing and equipment-parameter entry.

Load Signal and System Parameters. FIG. 2

The protection system 14 is usable with a wide variety of motors and drives. Parameters of the motor-and-drive system with which it is to be used are programmed into the protection system beforehand. An example of such a parameter is the horsepower. $I^2T$ protection of the motor 4 is provided according to both its "frame" horsepower $HP_f$ and the intended user horsepower $HP_{tr}$.

At the time of set-up, system parameters are entered via a data input device 18 (FIG. 2), and are stored and displayed in a storage and display unit 20. The system parameters include duty cycle, frame factor, and load offset. They are communicated from block 20 to a load-current-approximating circuit, block 22.

Certain computed quantities, including $M_{I2t}$ (modified $I^2T$ of motor) and $D_{I2t}$ (modified $I^2T$ of drive), which are more fully defined below, can preferably be viewed at the display 20.

The equipment of FIG. 2 provides, among other things, an output signal that is an approximate measure of the load on the motor. The output signal of block 22, which is at terminal 30, is based upon load current. Many conventional methods and circuits for approximating load current are known; current measurement and automatic computation are involved. The choices of particular method and circuit (block 22) are not important to the present invention. Preferably a controller 13 (FIG. 1) that controls the drive apparatus is used to compute an estimate of the load signal and to perform other computations required for the protection system.

Figure 3:
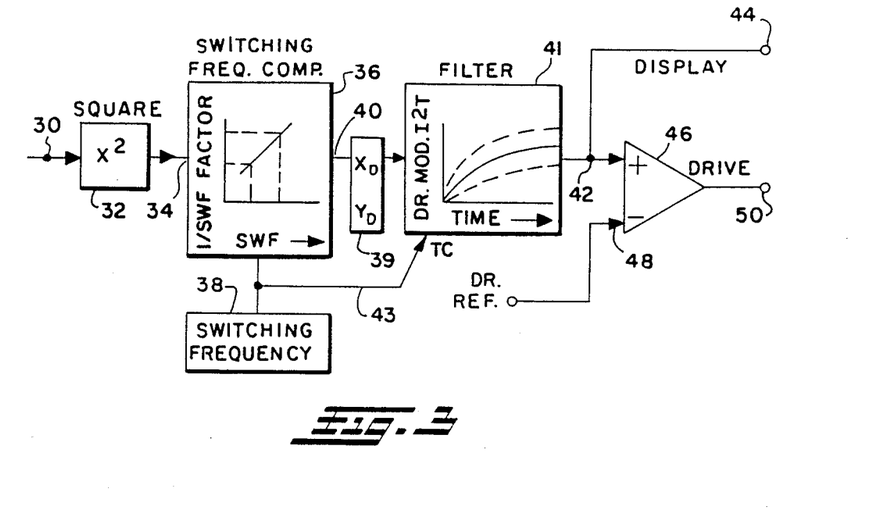
FIG. 3 is a block diagram of a portion of the protection system relating to drive-caused overload tripping.

Drive-Caused Tripping, FIG. 3

Figure 6:
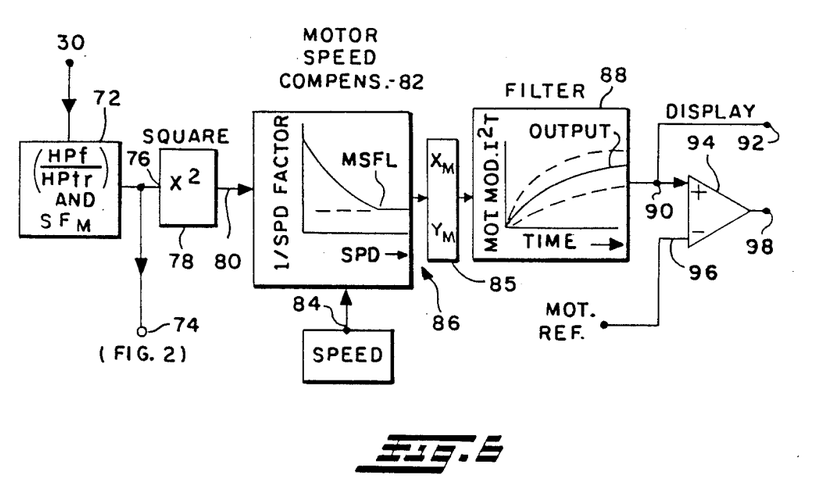
FIG. 6 is a block diagram of a portion of the protection apparatus relating to motor-caused overload tripping.

The overload-signal portion of the protection apparatus 14 includes two main channels, namely (a) the drive channel (including switching-frequency correction), FIG. 3; and (b) the motor channel (including speed correction), FIG. 6.

At terminal 30 of FIG. 3, a load-current signal is received from the load-current-approximating circuit 22 of FIG. 2. That signal is squared in a squaring module 32, whose output is connected to a data input terminal 34 of a switching-frequency-compensation module 36.

The drive-related overload protection is based on the load and on the frequency with which switching elements in the inverter are switched. Another data input terminal 38 to the switching-frequency-compensation module 36 receives a signal that depends upon the switching frequency SWF of the drive. As the switching frequency SWF increases, the overload signal at terminal 40 is made to increase, so the tripping time decreases.

Module 36 processes its two data inputs in accordance with a formula given below, and outputs a result at the terminal 40. The signal at terminal 40 goes to a block 39 that alters the signal in accordance with other factors $X_D$ and $Y_D$ if desired. Details of block 39 are in equation form below.

The output of block 39 is input to an inverter-overload digital lowpass filter 41. The lowpass filter's output, which is at terminal 42, is an overload signal $D_{\Omega t}$ accurately related to the temperature of the drive. This inverter-overload signal is connected via a line 44 to the display unit 20, and also to one input of a comparator amplifier 46.

A drive reference signal is connected to the other input 48 of the comparator amplifier 46. The predetermined reference signal at 48 represents a critical temperature trip value for drive protection. A drive-caused trip command appears at the output 50 of the comparator 46 when the inverter overload signal $D_{\Omega t}$ at 42 is equal to or greater than the inverter reference signal at 48. The drive-caused trip command trips the contactor 6.

The system being described has two different ratings. A frame may, for example, have a 40 HP constant torque (CT) rating and a 56 HP variable torque (VT) rating. For a typical such embodiment the VT rating is 140% of the CT rating. The variable torque rating is useful for fan drive applications.

At the constant torque CT rating 150% overload is permitted. It has a higher overload percentage and better waveform, corresponding to general-purpose applications. At the VT rating only a 110% overload is permitted. The peak currents are approximately equal for the two ratings.

At the CT rating a relatively high switching frequency, 2000 Hz, is permitted. At the VT rating the permissible switching frequency is only 1122 Hz. The maximum thermal effects are approximately equal for the two ratings.

Figure 4:
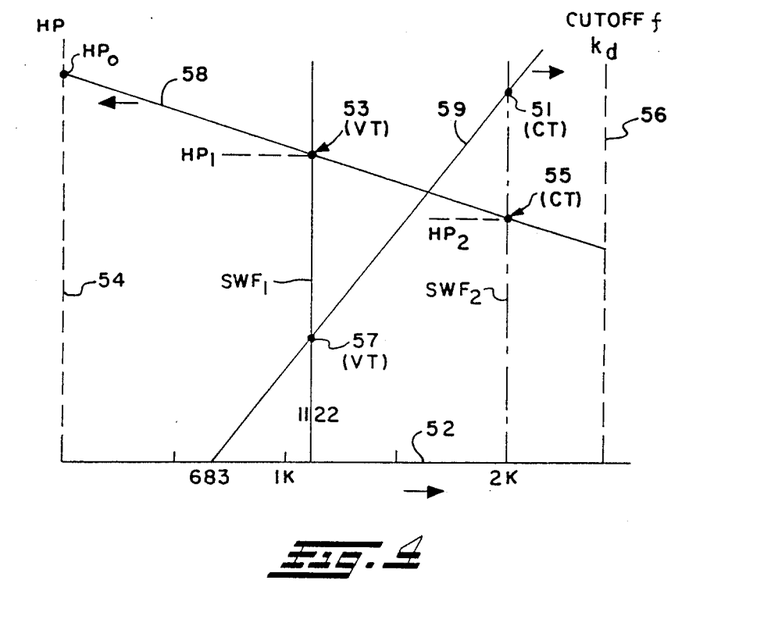
FIG. 4 is a graph of factors that vary as a function of the switching frequency of the drive, for use in compensating the load signal based on switching frequency, for drive-caused tripping.

Details of Effects of Switching Frequency, FIG. 4

Higher switching frequencies of the inverter correspond to greater effective heating of its switching devices, which are ordinarily semiconductors. At 2000 Hz about $\frac{1}{3}$ to $\frac{1}{2}$ of the heating is attributable to the switching frequency and the remainder is due to normal conduction. Switching-frequency information is employed, in the form of a switching-frequency factor, to modify the simulated "load current squared". The resulting modified estimates of power are continually sent into the lowpass filter 41.

The abscissa 52 of the graph of FIG. 4 is the switching frequency SWF of the inverter. The permissible horsepower HP of the motor is shown by a line 58 which is referred to the left-hand ordinate 54 of the graph. Higher values of switching frequency SWF correspond to lower values of horsepower HP. The 1122 Hz frequency of VT rating is at a point 53 on curve 58 and the 2000 Hz frequency of CT rating is at a point 55.

Another line, 59, of FIG. 4 defines the relationship between the switching frequency SWF and a variable lowpass filter cutoff frequency $k_d$ described below. Curve 59 is referred to the right-hand ordinate scale 56. Higher switching frequencies SWF correspond to higher values of $k_d$. The 1122 Hz frequency of VT rating is at a point 57 on curve 59 and the 2000 Hz frequency of CT rating is at a point 51. A switching-frequency factor $SWF_{factor}$ is developed, which is used in the filter 41 to control the response time (see block 41 of FIG. 3).

Figure 5:
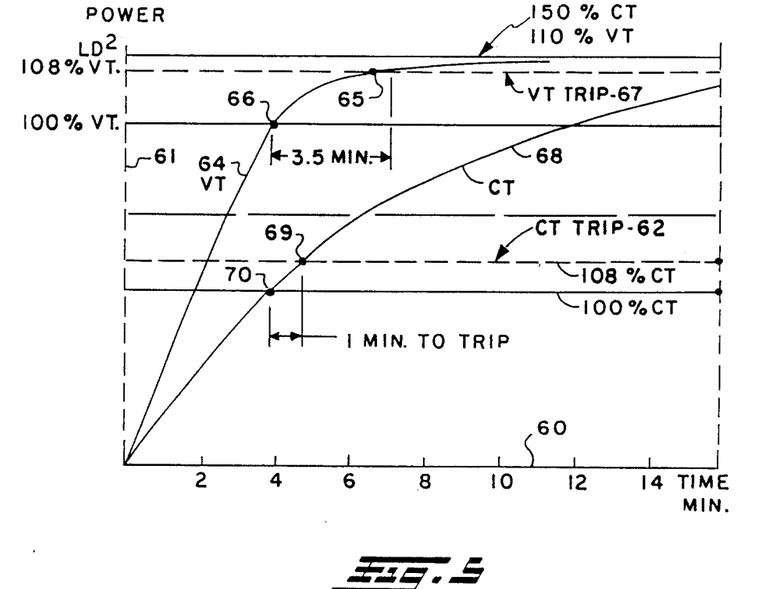
FIG. 5 is a graph of electrical loads on the drive as function of time, and of trip levels, for illustrating the action of the drive-overload apparatus of FIG. 3.

Drive-Overload Tripping Characteristics, FIG. 5

FIG. 5 illustrates the time-related characteristics of drive-caused tripping. The time delay of the filter 41 is tailored to provide different trip times for CT and VT ratings of the apparatus because there is a different overload capability for the two types of drives.

An abscissa scale 60 of FIG. 5 shows the time (minutes) from start of an overload to the instant of tripping. It applies to both a CT curve 68 and a VT curve 64. The left-hand ordinate scale 61 is proportional to the square of the VT load current (i.e., power) of the motor 4. The right-hand ordinate scale 63 is the square of the CT load current. When expressed as a percentage of rated load as in FIG. 5, the ordinate scales are numerically different for the two curves 64, 68 because of their different current ratings.

The lower curve 68 shows the square of the load as a function of time to trip in terms of CT rating. As shown by a point 69, tripping occurs 5 minutes after the start of a 150% load when starting from a cold start. Five minutes is the time required to reach the CT trip temperature, which is at 108% of CT load, as shown by the horizontal dashed line 62. Another point 70 of curve 68 is a starting point at 100% continuous load. Taken together with point 69, it shows that the tripping time is 1 minute after the load steps up to 150%, from that 100% starting point.

The upper curve 64 of FIG. 5 represents the behavior in terms of VT ratings. Point 65 corresponds to the time at which tripping occurs, i.e., when the temperature due to the load on the motor reaches the VT trip level of a horizontal dashed line 67. It is at 108% of rated VT load. Starting at point 66, which represents 100% of VT rating, the time to trip is 3.5 minutes. The curves 65 and 68 approach the same temperature asymptote at the top of FIG. 5, which is 150% of CT rating and 110% of VT rating.

Background Equations Regarding Temperature Rise

The following equations are generally applicable to both the drive and the motor. Power dissipation is given by:

$$P = I^2 r + P_o \qquad \text{(Equ. 1)}$$

where
P = power dissipation.
I = electrical load current causing the dissipation.
r = electrical resistance through which current I flows.
$P_o$ = miscellaneous power losses not proportional to $I^2$.

The power dissipation can also be expressed in terms of the temperature rise caused by the power dissipation:

$$P = (T_{ca}/R) + C^*(dT_{ca}/dt) \qquad \text{(Equ. 2)}$$

where
$T_{ca}$ = temperature rise above ambient.
R = thermal resistance. (= $T_{crit}$/rated power dissipation, where $T_{crit}$ is the steady-state temperature at rated power dissipation).

C=transient thermal impedance. (=thermal time constant/R)
t=time
The symbol * means multiply
Solving Equ. 2 for $T_{ca}$ yields:

$$T_{ca} = R * P + (T_o - RP) * \exp(-t/RC) \quad \text{(Equ. 3)}$$
$$= [R * P], \text{ (except that it is lowpass filtered)}$$
$$= [R(I^2r + P_o)], \text{ (except lowpass filtered)}$$
$$= T_{n-1} * (1 - FC) + [R (I^2r + P_o)_n] * FC \quad \text{(Equ. 4)}$$

where
$T_o$=a starting temperature at time zero, at which time a step increase of power dissipation starts.
FC=the digital filter constant, which is equal to the sample time (i.e., time between taking of data samples) divided by the thermal time constant R*C.
n=index of successive samples of data.
Equation 4 is a digital version of Equ. 3.
When such a simulation of temperature rise is employed for overload protection, the $I^2$ part of Equ. 4 provides what is ordinarily referred to as $I^2T$ protection.

Temperature of the Drive

Returning now to the invention, a quantity $D_{\Omega T}$ is developed as measure of the temperature of the drive. When $D_{\Omega T}$ reaches a value of 1.0, it is at the threshold temperature $T_{critD}$ at which a protective action such as disconnection of the system from the power line occurs.

$$D_{\Omega T} = T_{aD}/T_{critD} \quad \text{(Equ. 5)}$$
$$= [(I/SF_D)^2/SWF_{factor}] * X_D + Y_D, \text{ filtered.}$$

where
$T_{aD}$=temperature of the drive.
$T_{critD}$=maximum permissible temperature for the drive.
$SF_D$=service factor for the driver, i.e., the steady-state overload for which the critical temperature is essentially reached after four thermal time constants. Typical drive $SF_d$ is 1.08.

$$SWF_{factor} = \text{switching frequency factor.}$$
$$= [HP_1 * SWF_2 - HP_2 * SWF_1 + (HP_2 - HP_1) * SWF]/(SWF_2 - SWF_1)$$

This $SWF_{factor}$ is Equ. 6, which is plotted as line 58 of FIG. 4. The first half of the right-hand member of Equ. 6 corresponds to an ordinate-axis intercept of the curve 58 at a point $HP_o$. The second half corresponds to a point-slope expression for the line 58 based upon points 53 and 55. The value of HP at point 53 is $HP_1$; the value of HP at point 55 is $HP_2$. The value of switching frequency SWF at point 53 is $SWF_1$; the value of SWF at point 55 is $SWF_2$.

$X_D$ = *Provision for taking account of other factors affecting drive power dissipation or cooling—ones that are of a multiplicative nature. See block 39 of FIG. 3.*

$Y_D$ = *Provision for taking account of other factors affecting drive power dissipation or cooling—ones that are of an additive nature.*

The expression of Equ. 5 is subsequently filtered in block 41 (FIG. 3) in the manner indicated in Equ. 4, so that the instantaneous value of $D_{\Omega T}$ depends upon the duration of the drive overload.

The time constant FC of the filter 41 is also controlled by the switching frequency, as indicated by the conductor 43 of FIG. 3. The time spacings of subsequent data points of the filter 41 are inversely proportional to the switching frequency of the drive. The filter time constant as a function of SWF is shown as line 59 of FIG. 4.

Motor-Caused Tripping, FIG. 6

At terminal 30 of FIG. 6, a load current signal is received from the load-current-approximating circuit 22 of FIG. 2. It is modified in a module 72 by a ratio of rated horsepower $HP_f$ over user horsepower $HP_{tr}$, and by a "service factor" $SF_M$, all of which are further described below in equation form.

The output of the multiplier module 72 is connected to a terminal 74, which leads to the display unit 20, to provide information for the user. It is also connected to a terminal 76, which is the input to a conventional squaring module 78 that squares the value of the data that it receives.

The output of squarer 78 is connected to an input terminal 80 of a motor-speed-compensation module 82. Another input 84 to the speed-compensation module 82 receives a data signal that changes as the speed of the motor 4 changes. Module 82 processes its two data inputs (80, 84) in accordance with a formula given below, and outputs a signal at a terminal 86.

The signal at terminal 86 goes to a block 85 that modifies the signal in accordance with other factors $X_M$ and $Y_M$ if desired. Details of block 85 are in equation form below.

The output of block 85 is input to a motor-overload lowpass filter 88. The filter's output, at terminal 90, is a motor-overload signal $M_{\Omega t}$. The motor-overload signal $M_{\Omega t}$ is connected to one input of a comparator amplifier 94 and, via a line 92 to the display unit 20.

A motor reference signal is connected to the other terminal 96 of the comparator amplifier 94. The motor reference signal represents a predetermined trip threshold value (10,000) for motor protection. A motor trip command appears at the output 98 of the comparator 94 when the motor overload signal at 90 is equal to or greater than the motor reference signal at terminal 96. The motor trip command is connected for tripping of the contactor 6.

Motor-caused tripping is a function of programmable parameters including (a) Applied Motor Trip Horsepower (which can be set at less than or equal to Frame Horsepower) and (b) a Motor Speed Factor $SPD_{factor}$, which is related to cooling of the motor.

Figure 7:
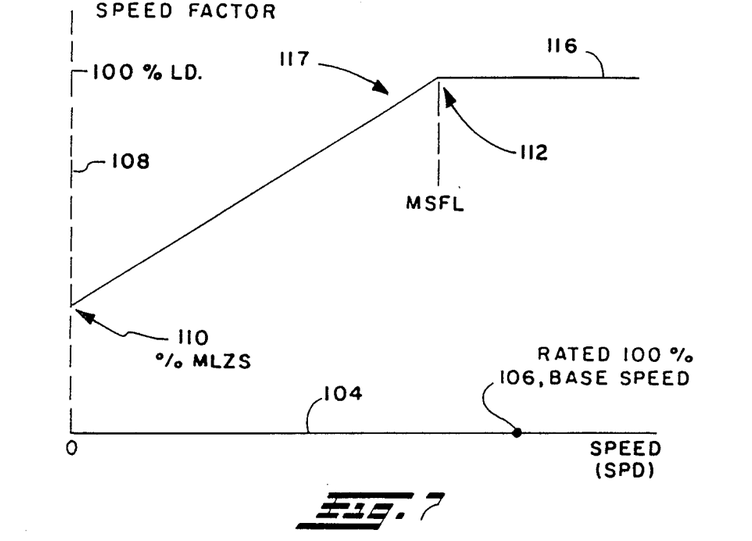
FIG. 7 is a graph of a "motor speed factor" used for compensating the load signal based on motor speed, for motor-caused tripping.

Details of Motor Speed Factor, FIG. 7

If the motor 4 drives its own cooling device, such as the fan 5, the greater the motor's speed, the greater the rate at which its cooling medium (e.g. air), passes through it. Motors often cool poorly at low speeds. It has a different thermal resistance. Therefore, arrangements are made for the motor overload signal $M_{\Omega t}$ to increase as the speed decreases, to compensate for the poorer cooling by tripping earlier. A speed factor $SPD_{factor}$ is developed (equation 8), which is used in the denominator of a speed correction computation that affects the tripping time.

The abscissa 104 of the graph of FIG. 7 is the speed SPD of the motor, with the base speed SPD$_{base}$ indicated at a point 106. The ordinate 108 is the speed factor SPD$_{factor}$, 100% rated load is arbitrarily represented for convenience of computation by the number 1024. The maximum load at zero speed %MLZS is shown at a point 110, and minimum motor speed at which full load can be achieved MSFL is shown at a point 112.

A straight line 114 connects the points 110 and 112, to represent the changes that are necessary at low speeds because of poor cooling. Another straight line 116 extends horizontally to the right from point 112, representing a constant value of the speed factor SPD$_{factor}$ when the speed SPD is great enough not to require compensation. These two lines together are curve 117. The reciprocal of curve 117 is employed in block 82 of FIG. 6, for making compensating corrections in a motor-overload signal.

Figure 8:
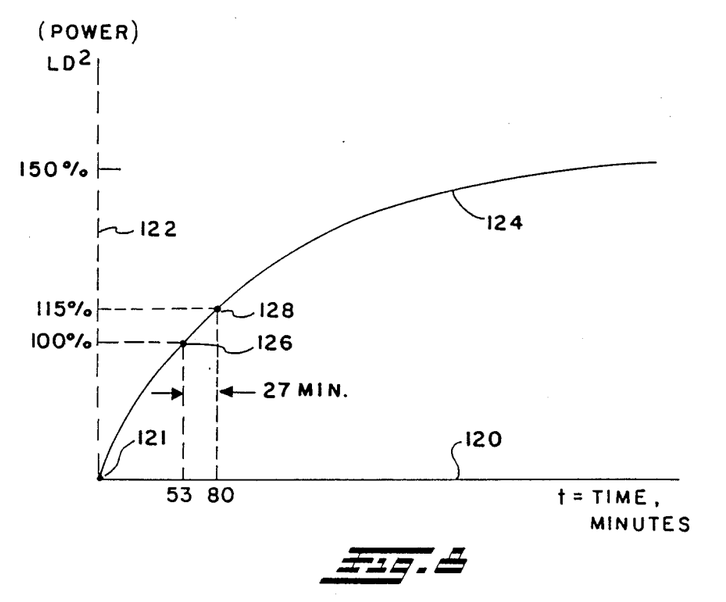
FIG. 8 is a graph of the power in the motor as a function of time, for illustrating the motor-overload protection apparatus of FIG. 6.

Motor-Overload Tripping Characteristics, FIG. 8

The time-related characteristics of the motor-overload tripping are illustrated in a graph of FIG. 8. The abscissa 120 shows the time from start of a motor overload to tripping of the contactor 6, when tripping is due to overload of the motor itself. The ordinate scale 122 represents the power of the load on the motor, and therefore is related to the temperature of the motor.

A curve 124 shows the temperature as a function of time after start of an overload. For the embodiment being described some illustrative numerical values are as follows. The motor's thermal time constant is 90 minutes. With applied load of 150% of motor trip horsepower rating at base speed, the overload trips off the equipment after 80 minutes (point 128) from a cold start at point 121. If the starting point is point 126, which represents 100% CT load, the contactor 6 trips open after 27 minutes. The output M$_{I2t}$ of the filter 88 is an approximate measure of the temperature of the motor.

Temperature of the Motor

A quantity M$_{I2T}$ is developed to serve as a relative measure of the temperature of the motor 4. When M$_{I2T}$ reaches a value of 1.0, the motor is at a predetermined threshold temperature T$_{critM}$. Thereupon, the protection subsystem 14 initiates a protective action such as disconnection of the motor and drive from the power line.

$$M_{I2T} = T_{aM}/T_{critM} \quad \text{(Equ. 7)}$$
$$= [(I * [HP_f/HP_{tr}]/SF_M)^2/SPD_{factor}] * X_M + Y_M$$

where

T$_{aM}$ = temperature of the motor.
T$_{critM}$ = maximum permissible temperature for the motor.
HP$_f$ = frame horsepower.
HP$_{tr}$ = trip horsepower for user's application.
SF$_M$ = service factor for the motor, i.e., the steady-state overload for which the critical temperature is essentially reached in four thermal time constants. (A typical motor SF$_M$ is 1.15.)

SPD$_{factor}$ = 1 if speed (or, in some systems, speed refc), is greater than MSFL. Otherwise, it
= [100 − % MLZS) * (Speed/Speed$_{base}$)/MSFL] + MLZS.

This SPD$_{factor}$ is Equ. 8, which is plotted in FIG. 7.

X$_M$ = provision for taking account of other factors affecting motor power dissipation or cooling—ones that are of a multiplicative nature. See block 85 of FIG. 6.
Y$_M$ = provision for taking account of other factors affecting motor power dissipation or cooling—ones that are of an additive nature.
Parameter MSFL = minimum speed for full load.
Parameter MLZS = maximum load at zero speed.
Speed = motor speed.
Speed$_{base}$ = base speed, or rated speed (which has a value = 100%).

The expression of Equ. 7 is subsequently filtered in block 88 (FIG. 6) in the manner indicated in Equ. 4, so that the instantaneous value of M$_{I2T}$ depends upon the duration of the motor overload.

Breadth of the Invention

Although only one preferred embodiment has been described, the invention can be practiced in many other versions. For example, the preferred embodiment described herein involves both hardware and software; the invention could instead be implemented entirely by hardware if desired. The scope of the invention is defined by the claims.

The signal-processing functions that are shown in the blocks of FIGS. 1, 2, 3 and 6 can be implemented in either digital or analog form; digital is preferred. Well-known conventional design and software techniques are adequate to implement each of those specified functions, and the design details, which are immaterial to the invention, are not described here.

The embodiment described above biases the comparison between D$_{I2t}$ (heating signal at terminal 42 of FIG. 3) and the reference threshold (at terminal 48) for the inverter by changing the D$_{I2t}$ channel's signal in accordance with the switching frequency SWF. The frequency-bias of the comparison could instead be accomplished by changing the reference threshold (or both).

Similarly, in the motor-related tripping circuit of FIG. 6, the comparison of the heating signal M$_{I2t}$ and the reference threshold could be biased in accordance with the motor's speed by altering the threshold instead of modifying the heating signal.

Innumerable other variations are possible within the scope of the invention.

I claim:
1. Overload protection apparatus (14) for a motor-and-drive system in which the drive (8) switches at a switching frequency, said system having a load current, comprising:
 means (32) for providing a current-based signal based on the load current, to serve as a measure of the rate of heating of the drive by said load current;
 means (48) for providing a threshold level at which protection is to occur;
 comparator means (46) for comparing said current-based signal with said threshold level (48) and providing a protection signal (50) when the current-based signal exceeds the threshold level;

means (38) for providing a frequency-responsive signal that varies in response to the switching frequency of the drive;

means (36) responsive to said frequency-responsive signal for modifying at least one of said current-based signal and said threshold level to provide said protection signal (50) at a lower value of said current-based signal when said switching frequency is greater.

2. Overload protection apparatus as in claim 1 and further comprising filter means (41) for low-pass filtering of said current-based signal.

3. Overload protection apparatus as in claim 2 and:
wherein said lowpass filter means (41) has a low-pass frequency characteristic;
wherein said means (38) for providing a frequency-responsive signal further comprises means for providing a frequency-responsive signal to said filter means;
further comprising means for varying the frequency characteristic of said lowpass filter means (41) to increase the frequencies that it transmits when said switching frequency increases.

4. Overload protection apparatus as in claim 1 and wherein said means for providing a current-based signal comprises:
means for providing an estimate of load current;
means for squaring said estimate of load current.

5. Overload protection apparatus (14) for a motor-and-drive system, said system having a load current, comprising:
means (78) for providing a current-based signal based on the load current, to serve as a measure of the heating of the motor by said load current;
means (96) for providing a threshold level at which protection is to occur;
comparator means (94) for comparing said current-based signal with said threshold level (96) and providing a protection signal (98) when the current-based signal exceeds the threshold level;
means (84) for providing a speed signal that varies in response to the speed of the motor;
means (82) responsive to said speed signal for modifying at least one of said current-based signal and said threshold level to provide said protection signal at a lower value of said current-based signal when said speed is lower.

6. Overload protection apparatus as in claim 5 and wherein said means for providing a current-based signal comprises:
means for providing an estimate of load current;
means for squaring said estimate of load current to serve as a measure of the heating of the motor by said load current.

7. Overload protection apparatus (14) for a motor-and-drive system in which the drive (8) switches at a switching frequency said system having a load current, comprising:
means (32) for providing a drive current-based signal based on the load current, to serve as a measure of the rate of heating of the drive by said load current;
means (48) for providing a drive threshold level at which drive protection is to occur;
drive comparator means (46) for comparing said drive current-based signal with said drive threshold level (48) and providing a drive protection signal (50) when the drive current-based signal exceeds the drive threshold level;
means (38) for providing a frequency-responsive signal that varies in response to the switching frequency of the drive;
means (36) responsive to said frequency-responsive signal for modifying at least one of said current-based signal and said drive threshold level to provide said drive protection signal (50) at a lower value of said current-based signal when said switching frequency is greater;
means (78) for providing a motor current-based signal based on the load current, to serve as a measure of the heating of the motor by said load current;
means (96) for providing a motor threshold level at which motor protection is to occur;
motor comparator means (94) for comparing said motor current-based signal with said motor threshold level (96) and providing a motor protection signal (98) when the motor current-based signal exceeds the motor threshold level;
means (84) for providing a speed signal that varies in response to the speed of the motor;
means (82) responsive to said speed signal for modifying at least one of said motor current-based signal and said motor threshold level to provide said motor protection signal at a lower value of said motor current-based signal when said speed is lower.

8. Overload protection apparatus as in claim 7 and further comprising drive filter means (41) for filtering of said drive current-based signal;
wherein said drive filter means (41) has a low-pass frequency characteristic;
wherein said means (38) for providing a frequency-responsive signal further comprises means for providing a frequency-responsive signal to said drive filter means for varying the frequency characteristic of said drive filter means (41) to increase the frequencies that it transmits when said switching frequency increases.

* * * * *